(12) United States Patent
Lee et al.

(10) Patent No.: US 10,832,415 B2
(45) Date of Patent: Nov. 10, 2020

(54) WINDOW IMAGE DETECTION METHOD AND DEVICE

(71) Applicant: ARCHIDRAW. INC., Seoul (KR)

(72) Inventors: Jusung Lee, Seoul (KR); Jongseon Hong, Seoul (KR)

(73) Assignee: ARCHIDRAW. INC., Seoul (KR)

( * ) Notice: Subject to any disclaimer, the term of this patent is extended or adjusted under 35 U.S.C. 154(b) by 65 days.

(21) Appl. No.: 16/087,642

(22) PCT Filed: Mar. 14, 2017

(86) PCT No.: PCT/KR2017/002707
§ 371 (c)(1),
(2) Date: Sep. 22, 2018

(87) PCT Pub. No.: WO2017/175980
PCT Pub. Date: Oct. 12, 2017

(65) Prior Publication Data
US 2019/0114778 A1 Apr. 18, 2019

(30) Foreign Application Priority Data

Apr. 7, 2016 (KR) .................. 10-2016-0043076

(51) Int. Cl.
*G06T 7/13* (2017.01)
*G06K 9/00* (2006.01)
*G06T 7/155* (2017.01)

(52) U.S. Cl.
CPC ............ *G06T 7/13* (2017.01); *G06K 9/00476* (2013.01); *G06T 7/155* (2017.01); *G06T 2207/20036* (2013.01); *G06T 2210/04* (2013.01)

(58) Field of Classification Search
None
See application file for complete search history.

(56) References Cited

U.S. PATENT DOCUMENTS

| | | | | |
|---|---|---|---|---|
| 2007/0237361 | A1* | 10/2007 | Sandor | G06K 9/00476 382/104 |
| 2009/0274394 | A1 | 11/2009 | Tsunematsu | |
| 2015/0131871 | A1* | 5/2015 | Chen | G06K 9/00476 382/113 |
| 2016/0063722 | A1* | 3/2016 | Allred | G06F 30/00 345/665 |

FOREIGN PATENT DOCUMENTS

| | | |
|---|---|---|
| JP | 2001-319239 A | 11/2001 |
| KR | 10-2009-0029447 A | 3/2009 |
| KR | 10-2012-0013744 A | 2/2012 |
| KR | 10-2013-0055119 A | 5/2013 |

* cited by examiner

*Primary Examiner* — Justin P. Misleh
(74) *Attorney, Agent, or Firm* — Novick, Kim & Lee, PLLC; Sang Ho Lee

(57) ABSTRACT

Provided are a method and an apparatus for detecting door image, and the method includes extracting an outline from the drawing; detecting an end point of the outline; detecting a directionality of the end point; detecting a peak adjacent the end point using the directionality; and detecting at least one window image using at least one of the number and position of the peak.

19 Claims, 10 Drawing Sheets

700

| 8 | 1 | 2 |
| 7 | P | 3 |
| 6 | 5 | 4 |

FIG. 7

WINDOW IMAGE DETECTION METHOD AND DEVICE

TECHNICAL FIELD

The present invention relates to a method and an apparatus of detecting a window image included in the drawing.

This application claims priority to Korean Patent Application No. 10-2016-0043076 filed in the Korean Intellectual Property Office on Apr. 7, 2016, the entire contents of which are incorporated herein by reference.

BACKGROUND ART

Generally, a CAD program is installed in a personal computer or a notebook computer to design a drawing, the drawing is designed using a drawing device such as a mouse or a tablet to obtain the designed drawings.

A user can open the designed drawings with DWG or DXF form by other computer using CAD program, and the user can design drawings by editing work such as correction work.

In addition, if the designed drawing is converted into an image file (for example, JPG file, GIF file, PNG file, etc.) or PDF file, the user can view the image file using other view program. But it is impossible that the user can not reuse the image file.

On the other hand, the conventional technology, for converting a file such as an image file back to a CAD drawing, is enable to for interwork with CAD as an electric pen combined with a mouse or for automatically create, store or write a CAD file on the web or in anytime and anywhere without being limited by time. The user may control CAD by using an optical sensor or a pen-shaped optical mouse simultaneously and can create an image and a drawing file with DWG or DXF form and can save into a storing device (for example, memory) of the an electric pen in the conventional technology. And the user can make a file of TEXT type by handwriting input only, and it can also be saved as a text (character) format of CAD.

However, the above conventional technique has a disadvantage that it is impossible to reuse the image file because the image file can not be converted back to the design drawing, and there is the inconvenience that the user must directly sketch or manually read the design drawing with a digital electronic pen mouse in the conventional technique for automatically generating CAD drawings using the digital electronic pen mouse.

In addition, as making the design drawing, the user may receive the drawing image file and detect specific elements such as a door, a window, or a washstand from the drawing image to check the element coordinate information, or use the detected specific element for a service work such as an interior work.

DISCLOSURE

Technical Problem

The present invention has been made to solve the above problems, and it is an object of the present invention to provide a method and an apparatus of detecting a window image, that can accurately and easily detect the window image.

Technical Solution

In one aspect, a method for detecting a window image from a drawing including a plurality of image elements, the method includes extracting an outline from the drawing; detecting an end point of the outline; detecting a directionality of the end point; detecting a peak adjacent the end point using the directionality; and detecting at least one window image using at least one of the number and position of the peak.

Meanwhile, the window image detecting method may be implemented as a computer program for performing the door image detecting method and stored in a recording medium, also the door image detecting method may be performed by a terminal device according to an embodiment of the present invention.

In another aspect, an apparatus for detecting a window image from a drawing including a plurality of image elements, the apparatus includes an outline extracting unit for extracting an outline from the drawing; an end point detecting unit for detecting an end point of the outline and detecting a directionality of the end point; a peak detecting unit for detecting a peak adjacent the end point using the directionality; and a window detecting unit for detecting at least one window image using at least one of the number and position of the peak.

Advantageous Effects

According to an embodiment of the present invention, the present invention is to provide a method and an apparatus of detecting a window image, that can accurately and easily detect the window image by detecting the position and orientation of an end point of an outline extracted from the drawing and detecting the window based on the number or position of peaks existing among the end points.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 7 is a view for explaining an embodiment of a 3×3 kernel.

BEST MODE

Figure 1:
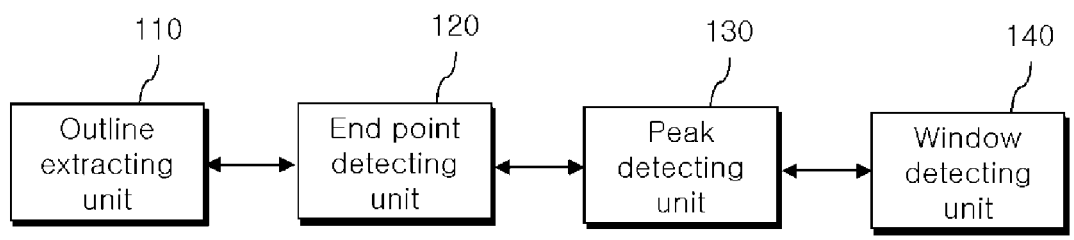
FIG. 1 is a block diagram showing a configuration of a window image detecting apparatus according to an embodiment of the present invention.

Content of below illustrates only a principle of the present invention. Therefore, those skilled in the art will invention to a variety of devices that are included in the scope of this concept, although clearly described or implementing the principles of the present invention, have not been shown herein invention. Further, all the conditional terms and embodiments listed herein, for example, are as a general rule, and only to that understanding the concept of the present invention clearly intended, be understood that not limited to this manner specifically enumerated embodiments and conditions do.

In addition, not only the principles, viewpoints and embodiments of the invention all the description listing the particular embodiments are to be understood to be intended to include structural and functional equivalents of such locations. In addition, it is to be understood as including equivalents such waters all devices invented to make, as well as equivalents now known or that is independent of the equivalent structures will be developed in the future to perform the same function.

Thus, for example, block diagrams of the present specification are to be understood as representing a conceptual viewpoint of an exemplary circuit that embodies the principles of the invention. Similarly, all the flowcharts, state conversion degree, the pseudo-code, etc. are understood to represent a variety of processes regardless of whether the computer can substantially represent the readable medium there is clearly shown a computer or processor, and executed by a computer or processor, it should be.

Functions of the various elements shown in the figures, including functional blocks labeled as a processor or a similar concept can be provided through the use of dedicated hardware as well as hardware that has the capability of executing software in association with appropriate software. When provided by a processor, the functions may be provided by a single dedicated processor, single shared processor, or a plurality of individual processors, some of which may be shared.

The processor, control, or the explicit use of the term to be presented in a similar concept is to be construed by the hardware has the capability of executing software exclusive recited is not being, ROM for storing a digital signal processor (DSP) hardware, software, without limitation, (ROM), it is to be understood as comprising a random access memory (RAM) and nonvolatile memory implicitly. It can not contain other hardware in tolerance.

In the claims of this specification, the component expressed as a means for performing a function described in the detailed description include, for example, any type of software, including performing the function circuit combinations or firmware/microcode in the element such as was intended to include all methods for performing a function, it is combined with appropriate circuitry for executing the software for performing the functions. The present invention as defined by such claims are functions provided by the various listed means are coupled are bonded to the way that the claims require any means that can provide the function also equivalent to those identified from the specification it should be understood that.

The aforementioned objects, features and advantages will become more apparent from the following description in conjunction with the accompanying drawings, a self-technical features of the present invention one of ordinary skill in the art thus can be easily There will be. Further, the detailed description of the known art related to the invention In the following description of the present invention will be omitted and a detailed description on the case that are determined to unnecessarily obscure the subject matter of the present invention.

Hereinafter, a preferred embodiment of the present invention will be described in detail with reference to the accompanying drawings.

FIG. 1 is a block diagram showing a configuration of a window image detecting apparatus according to an embodiment of the present invention, as illustrated, the window image detecting apparatus 100 may include an outline extracting unit 110, an end point detecting unit 120, a peak detecting unit 130, and a window detecting unit 140.

The window image detecting apparatus 100 is for extracting an image of a specific element such as a door, a window, or a washstand included in the input drawing image. The door image detecting apparatus may be a terminal device such as a desktop computer, a mobile phone, a smart phone, or a laptop computer. However, the present invention is not limited thereto, and may be various devices capable of processing images and the like.

On the other hand, the drawing image input to the window image detecting apparatus 100 may be an image taken picture a hand-drawn drawing by a user, or an image file in the form of JPG, GIF, PNG, or PDF.

Referring to FIG. 1, the outline extracting unit 110 extracts an outline from the drawing to detect the window image from the drawing including a plurality of element images.

The element extracting unit 110 binarizes the drawing image, performs a morphology calculation for the image of the binarized drawing, performs a pre-processing of a thinning calculation for the drawing image on which the morphology calculation is performed, and then may extract the outline of the drawing for the end point detection.

The end point detects end points of the extracted outline, and detects the directionality of each of the detected end points.

For example, the end point detecting unit 120 moves a 3×3 kernel along the outline of the drawing image, detects end points of the outline, and then may obtain a direction vector for each of the detected end points.

On the other hand, the peak detecting unit 130 detects a peak adjacent to the corresponding end point using the directionality of the detected end point.

The window detecting unit 140 detects the window images included in the drawing using the number or position of the detected peaks.

According to an embodiment of the present invention, the window image detecting apparatus may more accurately and easily detect the window image from the general drawing image file by detecting the position and orientation of the end point of the outline extracted from the drawing and detecting the window based on the number or position of the peaks existing among the end points of the outline.

Hereinafter, with reference to FIGS. 2 to 13, embodiments of the method of detecting the window image according to the present invention will be described in more detail.

Figure 2:
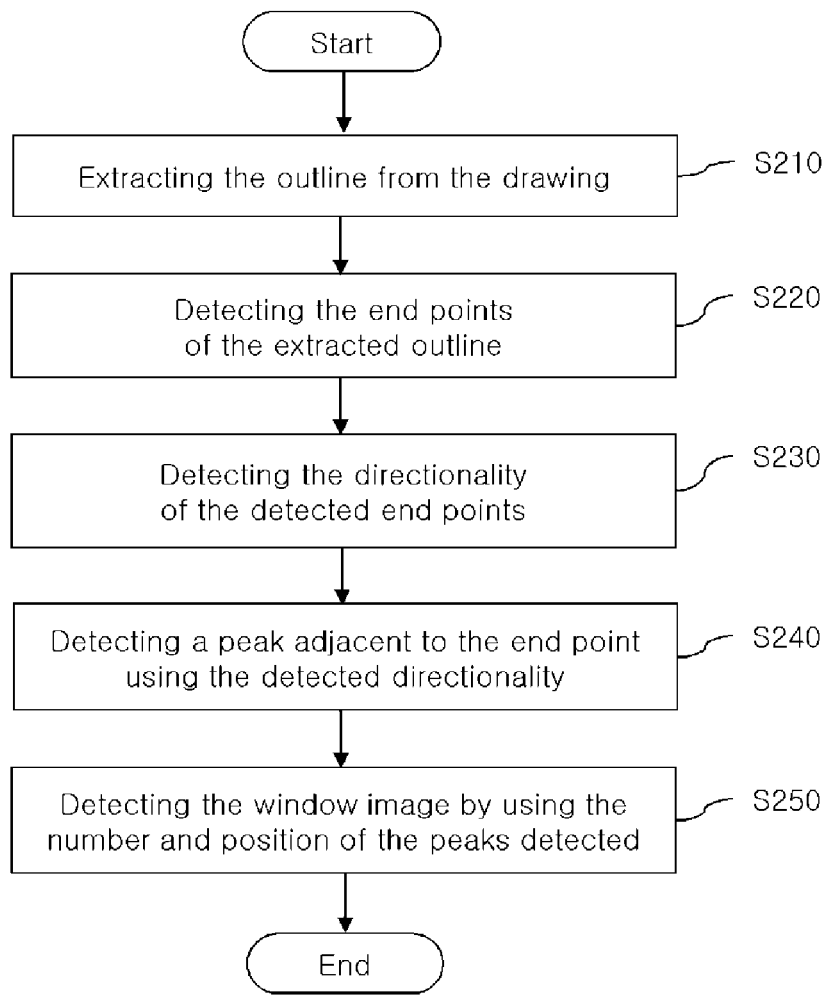
FIG. 2 is a flowchart illustrating a window image detecting method according to an embodiment of the present invention.

FIG. 2 is a flowchart illustrating the window image detecting method according to an embodiment of the present invention.

Referring to FIG. 2, a terminal device according to an embodiment of the present invention extracts the outline from the drawing (step S210).

Figure 3:
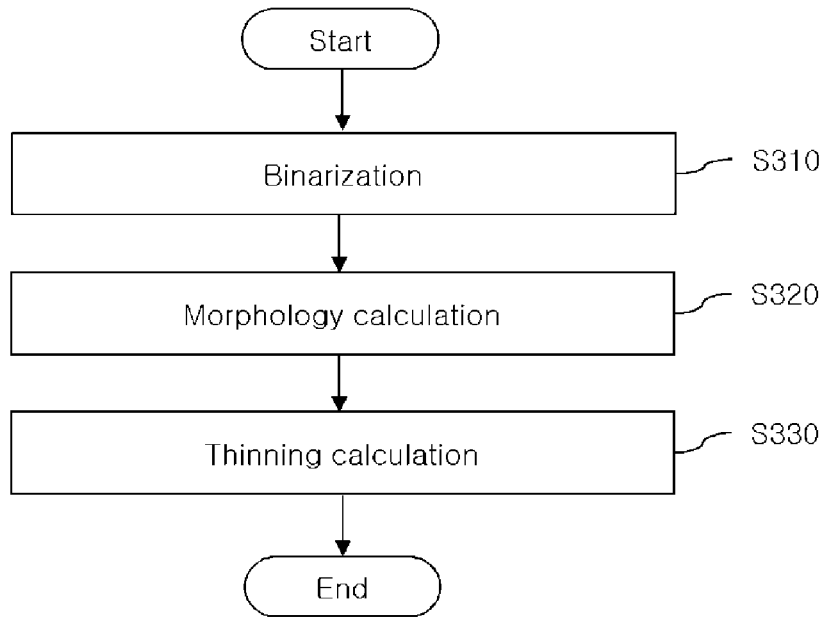
FIGS. 3 and 4 are flow charts illustrating embodiments of a method for pre-processing a drawing image.

In step S210, the terminal device sequentially performs a binarization step S310, a morphology calculation step S320 and a thinning calculation step S330, and may store the obtained image as a first image for end point detection as shown in FIG. 3.

For example, the terminal device may perform the morphology (open) and thinning calculations for the binarized drawing image, and remove the symbol components included in the drawing, thereby extracting only the outline.

Figure 4:
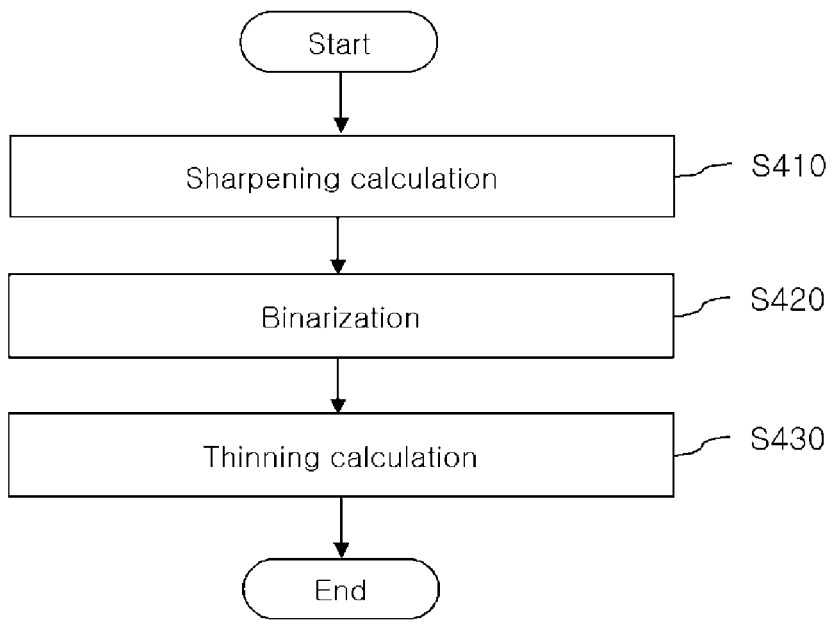

In addition, the terminal device may sequentially perform a sharpening calculation step S410, a binarization step S420 and a thinning calculation step S430 and may store the obtained image as a second image for peak detection as shown in FIG. 4.

The thinning calculation is for sharpening a boundary line included in the drawing image, the terminal device finds and makes more larger a larger point of change in the pixel value using Gaussian filter, Laplacian filter, or Median filter depending on the kind of a mask.

Accordingly, the problem of disappearance of elements such as the window or the door are may be reduced, as the boundary line is unclear due to input the low-quality drawing image. And it is possible to reduce the phenomenon that of influencing an algorithm performance for detecting the window or the door depends on the binarization result.

Figure 5:
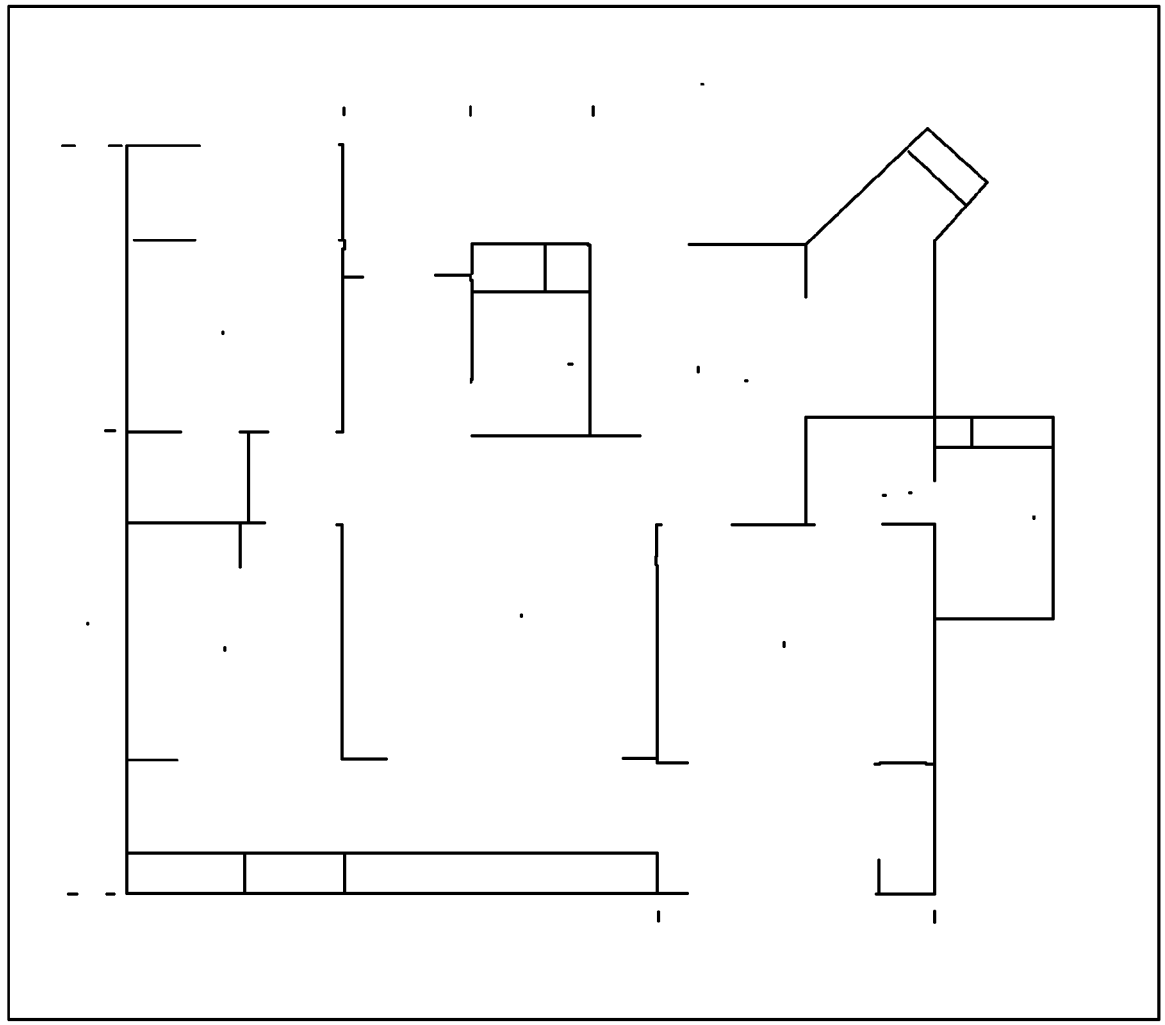
FIGS. 5 and 6 are views showing examples of pre-processed drawing images.

FIG. 5 is a view of an example of the first image for the end point detection as a result of the pre-processing process for the drawing image as shown in FIG. 4.

Figure 6:
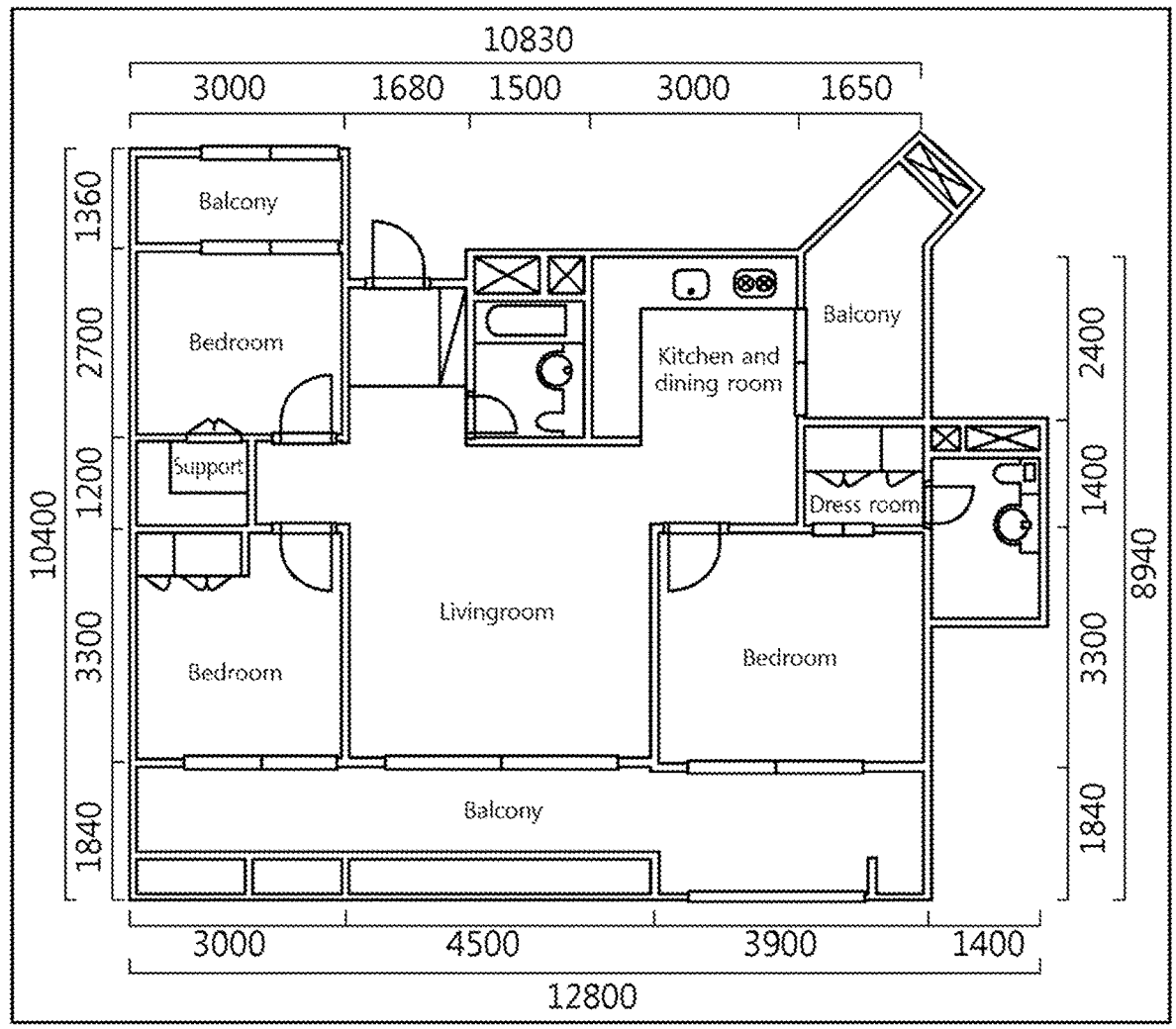

FIG. 6 is also a view an example of a second image for peak detection as a result of the pre-processing process for the drawing image as shown in FIG. 5.

Thereafter, the terminal device detects the end points of the outline extracted in step S210 (step S220).

For example, the terminal device may determine the position of the center pixel as the end point by using a 3×3 kernel if there is one valid pixel among eight peripheral pixels.

Figure 7:
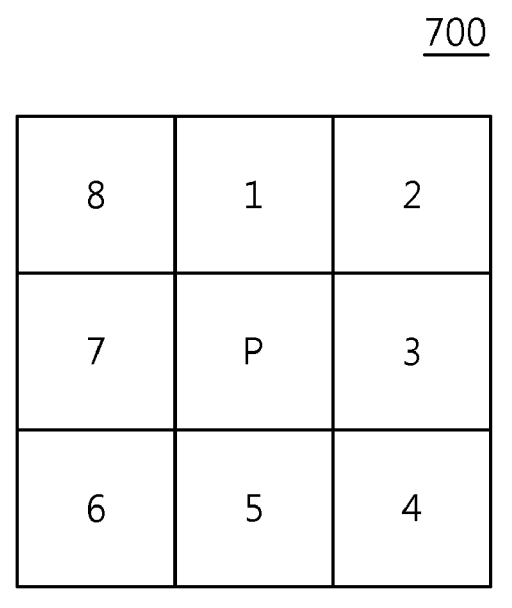

FIG. 7 is a view illustrating an embodiment of the 3×3 kernel, where the 3×3 kernel 700 may have a rectangular shape including nine regions having a specific size.

More specifically, the 3×3 kernel 700 has a center pixel P and 8 peripheral pixels around the center pixel P, where the eight peripheral pixels may each have a predetermined movement priority, and the movement priority may indicate an index of the corresponding pixel.

Since the 3×3 kernel 700 will be moved along the outline on the drawing image based on the predetermined movement priority, the movement direction of the 3×3 kernel 700 may be determined depending on the movement priority of each of the eight peripheral pixels.

According to an embodiment of the present invention, the 3×3 kernel 700 may be moved to the highest priority peripheral pixel direction among pixels (e.g., white) having a pixel value of a reference value or more among eight peripheral pixels.

On the other hand, an effective pixel (for example, white area) having the pixel value of the reference value or more among eight peripheral pixels is exist as the 3×3 kernel 700 moves along the outline, the terminal device may determine the position of the center pixel of the 3×3 kennel 700 as the end point.

Figure 8:
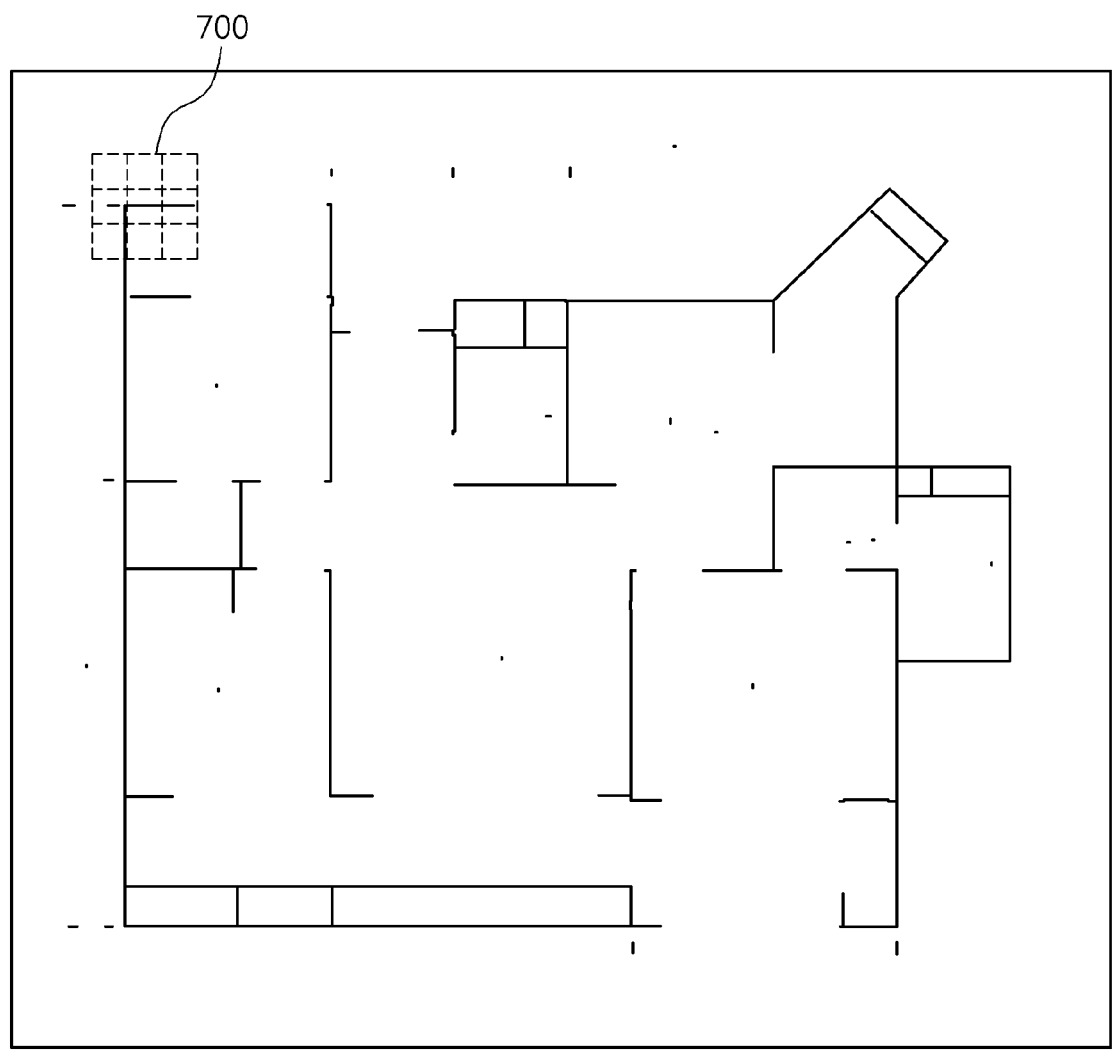
FIGS. 8 to 10 are views for explaining an embodiment of a method of detecting the position and directionality of an end point.

When the 3×3 kernel 700 is located as shown in FIG. 8, the terminal device may determine that the center pixel P is not to be the end point, since there are three valid pixels among the eight peripheral pixels among eight peripheral pixels.

Figure 9:
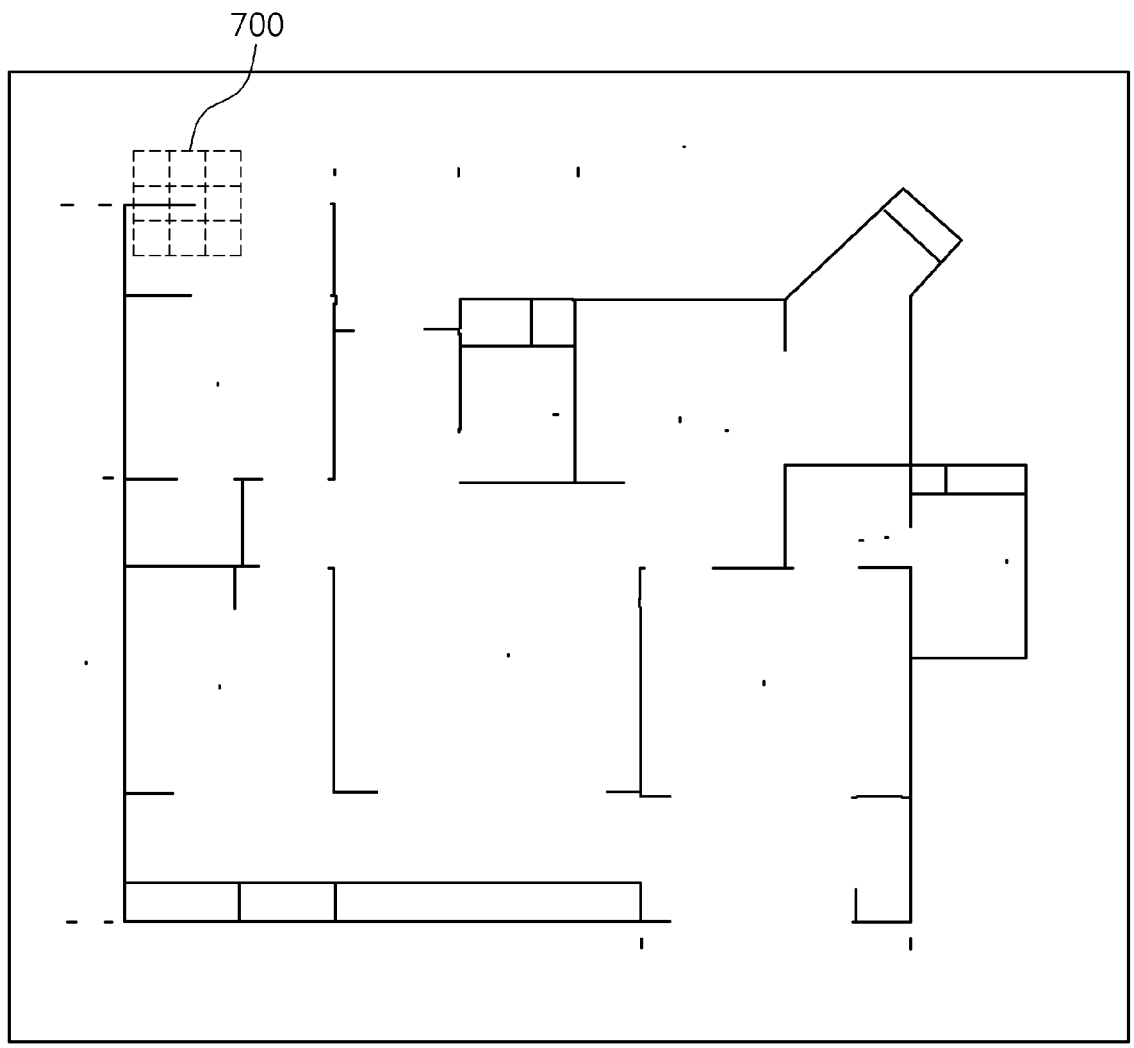

In this case, the coordinate components of the corresponding outline are stored in the memory, the 3×3 kernel 700 may be positioned as shown in FIG. 9 by moving to the right direction of the highest priority pixel among pixels (for example, white) having the pixel value more than the reference value among the peripheral pixels.

Referring to FIG. 9, the terminal device may determine that the center pixel P is the end point, since there is only one valid pixel among the eight peripheral pixels.

As the coordinates of the center pixel P determined as the end point are stored in the memory, the 3×3 kernel 700 is moved to the position of the outline not stored in memory, and thereby detecting other end points by repeating the same method as described above.

Thereafter, the terminal device detects the directionality of each of the detected end points (step S230).

For example, the terminal device detects the inflection point of the outline using the 3×3 kernel 700 moving along the outline on the drawing image as described above, and obtains directional vector of the end point based on the coordinates of the detected inflection point and the coordinates of the end point.

After the end point detection is completed, the 3×3 kernel 700 is moved to the end point position stored in the memory to be positioned as shown in FIG. 9.

Figure 10:
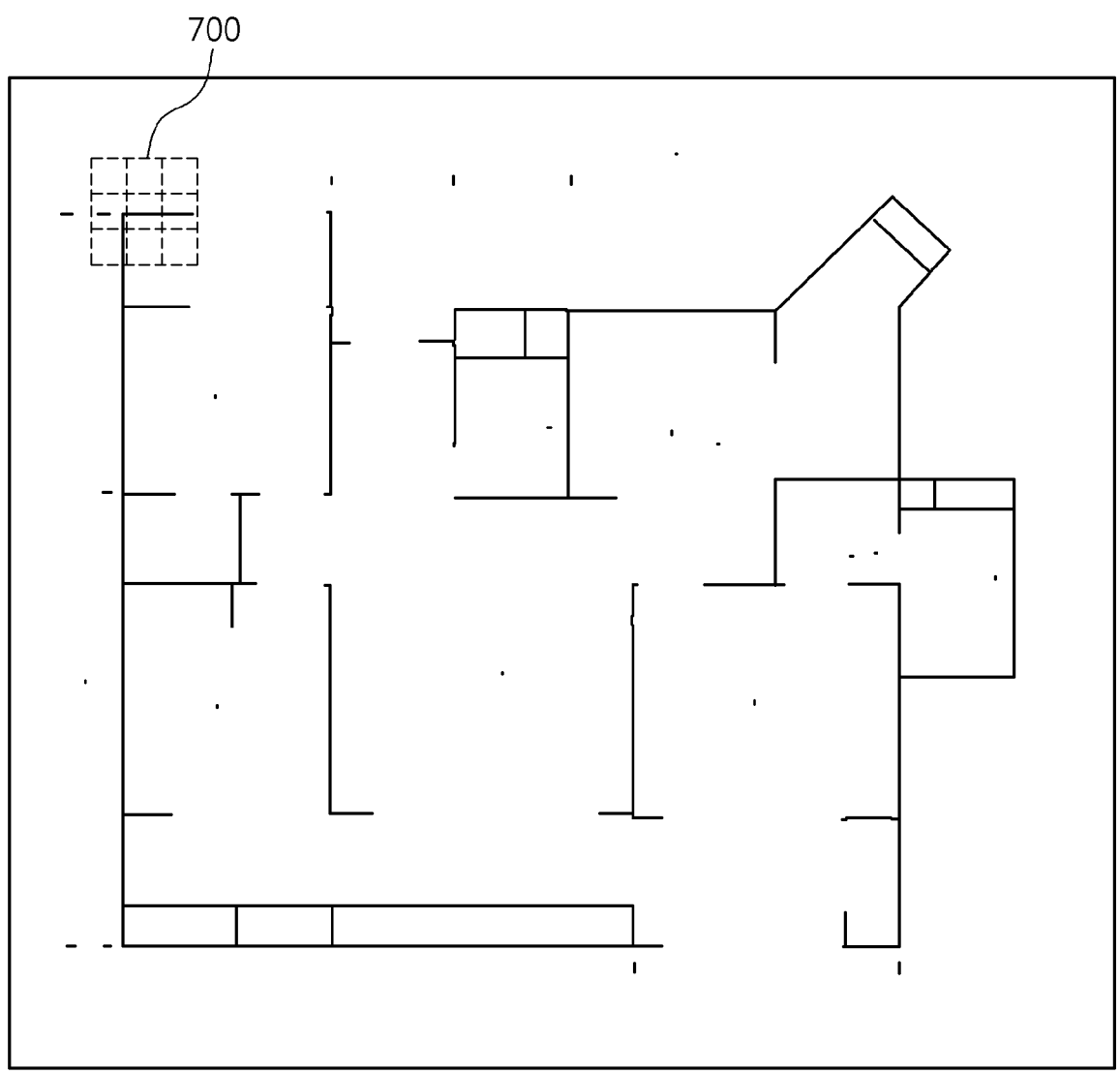

Thereafter, the 3×3 kernel 700 may be moved to the position shown in FIG. 10 depending on the movement priority of peripheral pixels as described above.

Referring to FIG. 10, if the inflection point is detected in the 3×3 kernel 700, it is defined that the vector from the detected coordinates of the inflection point to the corresponding end point indicates the directionality of the end point.

When the detection of the position and orientation of the end point is completed, the terminal device detects a peak adjacent to the end point using the directionality of the end point detected in step S230 (step S240).

For example, the terminal device may detect the peak adjacent to the end point by detecting the coordinates having the pixel value of the reference value or more, while moving from the corresponding end point to the end point adjacent thereto in the direction indicated by the direction vector of the end point.

Meanwhile, as described above, the peak detection in step S240 may be performed on the second image, which is the result of performing the pre-processing process for the drawing image as shown in FIG. 5.

Thereafter, the terminal device detects the window image by using the number and position of the peaks detected in step S240 (step S250).

Figure 11:
FIGS. 11 to 13 are views for explaining an embodiment of a method of detecting a window image depending on the number and position of peaks.
Figure 12:
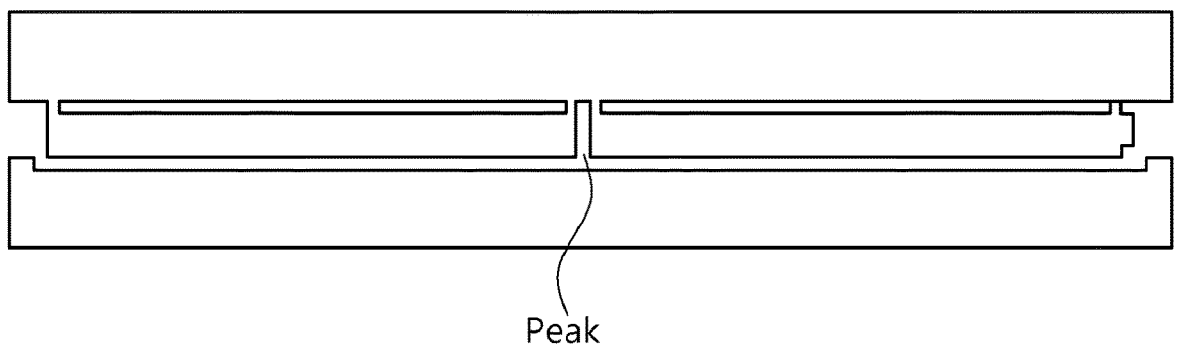

Referring to FIG. 11, two contiguous end points EP1 and EP2 having direction vectors facing each other may exist on the outline of the drawing image, the coordinate and direction vector of each of the adjacent end points EP1 and EP2 may be stored in memory.

On the other hand, if the adjacent end points EP1 and EP2 correspond to both ends of the window image, one peak may exist at an intermediate position between the end points EP1 and EP2 adjacent to each other.

Accordingly, if only one peak is detected between the end points EP1 and EP2 adjacent to each other as described above, the coordinates of the corresponding peak may be stored in the memory as a window image candidate group.

On the other hand, if there is no peak between the end points EP1 and EP2 adjacent to each other, or two or more peaks are exist, the corresponding end points EP1 and EP2 may be excluded from the window image candidate group.

Thereafter, if the one peak is exist at the intermediate position between the adjacent end points EP1 and EP2, the terminal device may store the coordinates of the corresponding peak as the coordinates of the window image.

Figure 13:
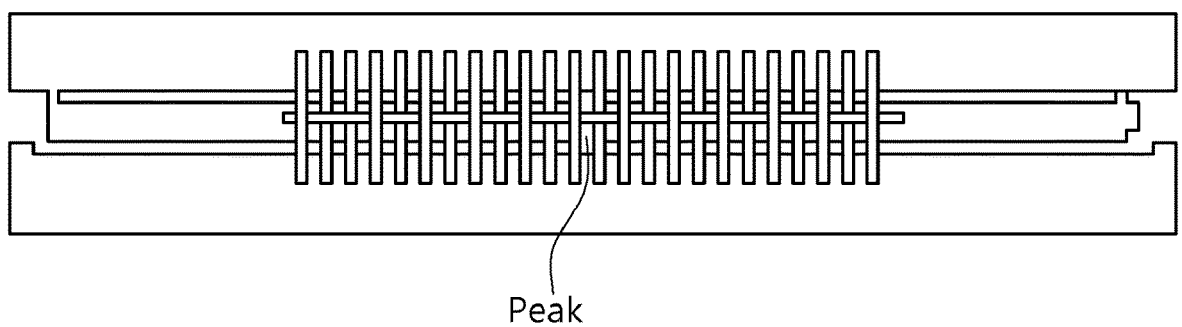

Referring to FIG. 13, a plurality of vertical search bars having a predetermined interval are formed in a partial central region between adjacent end points EP1 and EP2, it is possible to judge whether or not the position of the peak is symmetrical to the center by judging the position of the search bars corresponding the peak position among the plurality of detection bars.

After the coordinates of the window image are stored in the memory as described above, the terminal device can perform the post-processing step of excluding duplicate detection results having the same coordinates among the detected window images.

The post-processing step is performed that peak coordinates corresponding to each of the two end points for one window image may be stored in the memory, because steps S230 to S250 may repeatedly perform for each of the end points as described above.

The window image detecting method according to the present invention may be stored in a computer-readable recording medium manufactured as a program to be executed in a computer, examples of the computer-readable recording medium include ROM, RAM, CD-ROM, a magnetic tape, a floppy disc, optical data storage devices, and it is implemented in the form of carrier waves (such as data transmission through the Internet).

Further, the computer-readable recording medium is distributed over network coupled computer systems so that the computer readable code is stored and executed in a distributed fashion. Then, the functional (functional) programs, codes, and code segments for accomplishing the present invention can be easily construed by programmers skilled in the art to which the invention pertains.

In addition, more than the been shown and described a preferred embodiment of the invention, the invention is not limited to the embodiment of the above-described particular, technology pertaining the art without departing from the subject matter of the present invention claimed in the claims field in the embodiment and various modifications are possible as well as by those of ordinary skill, this modified embodiment would should not be understood individually from the technical spirit or prospect of the present invention.

What is claimed is:

1. A method for detecting one or more window image elements from an image of an electronic drawing, the image of the electronic drawing including a plurality of image elements, and the method comprising:
   extracting an outline from the image of the electronic drawing;
   detecting one or more end points of the outline;
   detecting a directionality of each of the one or more end points;
   detecting one or more peaks adjacent the one or more end points using the directionality of the each of the one or more end points; and
   detecting the one or more window image elements using at least one of a number and position of the one or more peaks.

2. The method of claim 1, wherein the extracting the outline comprises:
   binarizing the image of the electronic drawing;
   performing a morphology calculation for the binarized image of the electronic drawing; and
   performing a thinning calculation for the image of the electronic drawing on which the morphology calculation is performed.

3. The method of claim 1, wherein the detecting the one or more end points comprises determining a position of a center pixel as an end point by using a 3×3 kernel when there is one valid pixel among eight peripheral pixels.

4. The method of claim 1, wherein the detecting the directionality comprises:
   detecting one or more inflection points of the outline using a 3×3 kernel; and
   obtaining a directional vector of the each of the one or more end points based on coordinates of the one or more inflection points and coordinates of the one or more end points.

5. The method of claim 3, wherein the 3×3 kernel is moved along the outline of the image of the electronic drawing based on predetermined movement priority information.

6. The method of claim 1, further comprising:
   performing a sharpening calculation on the image of the electronic drawing;
   binarizing the image of the electronic drawing on which the sharpening calculation is performed; and
   performing a thinning calculation for the binarized image of the electronic drawing,
   wherein the detecting the one or more peaks is performed on the image of the electronic drawing on which the thinning calculation is performed.

7. The method of claim 1, wherein the detecting the one or more peaks comprises detecting coordinates of a peak having a pixel value which is the same or greater than a reference value, while moving from a first end point to a second end point adjacent thereto in a direction of the detected directionality.

8. The method of claim 7, wherein the detecting the one or more window image elements comprises storing the coordinates of the peak as coordinates of a window image element when the number of the one or more peaks is one between the adjacent two end points.

9. The method of claim 7, wherein the detecting the one or more window image elements comprises storing the coordinates of the peak as coordinates of a window image element when the peak is located at an intermediate position between the adjacent two end points.

10. The method of claim 1, further comprising excluding duplicate detection results having the same coordinates among the one or more window image elements detected.

11. A non-transitory recording medium on which a program recorded thereon for executing the method of claim 1.

12. A terminal device performing the method of claim 1.

13. An apparatus for detecting one or more window image elements from an image of an electronic drawing, the image of the electronic drawing including a plurality of image elements, and the apparatus comprising one or more processors configured to:
   extract an outline from the image of the electronic drawing;
   detect one or more end points of the outline and detect a directionality of each of the one or more end points;
   detect one or more peaks adjacent the one or more end points using the directionality of the each of the one or more end points; and
   detect the one or more window image elements using at least one of a number and position of the one or more peaks.

14. The apparatus of claim 13, wherein the one or more processors are further configured to determine a position of a center pixel as an end point by using a 3×3 kernel when there is one valid pixel among eight peripheral pixels.

15. The apparatus of claim 14, wherein the 3×3 kernel is moved along the outline of the image of the electronic drawing based on predetermined movement priority information.

16. The apparatus of claim 13, wherein the one or more processors are further configured to:

detect one or more inflection points of the outline using a 3×3 kernel; and obtain a directional vector of the each of the one or more end points based on coordinates of the one or more inflection points and coordinates of the one or more end points.

17. The apparatus of claim 13, wherein the one or more processors are further configured to detect coordinates having a pixel value which is the same or greater than a reference value, while moving from a first end point to a second end point adjacent thereto in a direction of the detected directionality.

18. The apparatus of claim 17, wherein the one or more processors are further configured to store the coordinates of the peak as coordinates of a window image element when the number of the one or more peaks is one between the adjacent two end points.

19. The apparatus of claim 17, wherein the one or more processors are further configured to store the coordinates of the peak as coordinates of a window image element when the peak is located at an intermediate position between the adjacent two end points.

* * * * *